UNITED STATES PATENT OFFICE.

EDWARD WRAY, OF BIEBRICH-ON-THE-RHINE, GERMANY, ASSIGNOR TO THE FIRM OF KALLE AND COMPANY, AKTIENGESELLSCHAFT, OF BIEBRICH-ON-THE-RHINE, GERMANY.

MANUFACTURE OF VAT DYESTUFFS.

1,108,056. Specification of Letters Patent. Patented Aug. 18, 1914.

No Drawing. Application filed October 29, 1913. Serial No. 798,105.

*To all whom it may concern:*

Be it known that I, EDWARD WRAY, chemist, and a subject of the King of England, residing at 82 Rathausstrasse, Biebrich-on-the-Rhine, Germany, have invented certain new and useful Improvements in the Manufacture of Vat Dyestuffs, of which the following is a specification.

In the specification of German Letters Patent No. 241997 a process for producing vat dye-stuffs is described which consists in combining phenoöxynaphthocarbazoles derived from α-naphthylamin, with isatin-α-derivatives. The coloring matters obtained according to this known process dye the fiber gray to black tints. Now, I have found that blue to black-violet indigoid vat-dye-stuffs of this kind can be produced by employing in the condensation with the isatin-α-derivatives, those phenoöxynaphthocarbazoles which derive from β-napthylamin and have the following formula:

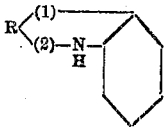

where R is the radical of an oxynaphthalene having a free ortho position to the hydroxyl group.

Example: 3 parts of 5-chloro-isatin-2-p-chloranilid are heated in about 25 parts by weight of acetic anhydrid with 2.3 parts of 2.1-pheno-5-oxynaphthocarbazole of the following formula:

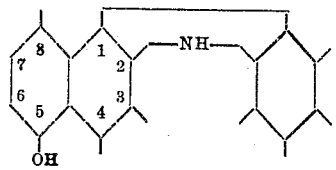

which have been obtained by fusing the carbazole from phenylhydrazin and 2-aminonaphthalene-5-sulfonic acid with caustic alkali. After cooling, the mass is filtered and washed with alcohol.

The produced dye-stuff is in dry state a violet powder, soluble in sulfuric acid with a grayish-blue color. It has the following graphically represented constitution:

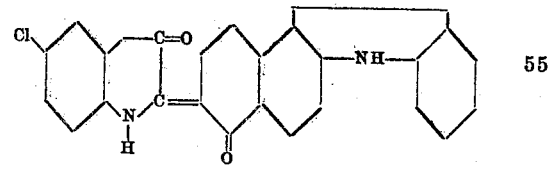

Reduced, it forms a goldish-yellow vat from which the textile fiber is dyed in dark blue tints becoming purer and redder on soaping or acidifying. Instead of 5-chloro-isatin-2-p-chloranilid other reactive isatin-α-derivatives, their substitution products, homologues or analogues may be employed, and also other derivatives of the used phenoöxynaphthocarbazole having a free ortho position next to the hydroxyl group.

The dye-stuffs obtained according to the present process may be halogenated in the usual manner *f. i.* by treating with bromin in the presence of nitrobenzene, sulfuric acid or other solvents or diluents.

The products of the present invention including the halogen-containing and halogenated products have a constitution graphically represented as follows:

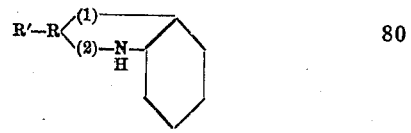

where R is the oxynaphthalene nucleus having a free ortho position to the oxy group, and R' is the radical of the alpha-isatin derivative, *e. g.*, the halogenated derivative.

I claim:

1. Process for producing vat dyestuffs which consists in treating phenoöxynaphthocarbazoles deriving from β-naphthylamin with the reactive isatin-α-derivatives.

2. Process for producing vat dye-stuffs which consists in treating 2.1-pheno-5-oxynaphthocarbazole with 5-chloro-isatin-2-p-chloranilid.

3. As new products the vat dye-stuffs obtainable by condensation of phenoöxynaphthocarbazoles derived from β-naphthylamin with the reactive isatin-α-derivatives, having the following graphically represented constitution:

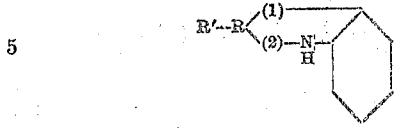

where R is the radical of an oxynaphthalene and R' an isatin radical in ortho position to the oxy group being blue to violet-black dyestuffs insoluble in the usual solvents and being reduced on treatment with reducing agents to leuco compounds, from which the dye-stuffs are regenerated by oxidizing agents.

4. As new products the vat dyestuffs obtainable by condensation of phenoöxynaphthocarbazoles derived from β-naphthylamin with the reactive isatin α-derivatives, said dyestuffs containing halogen and having the following graphically represented constitution:

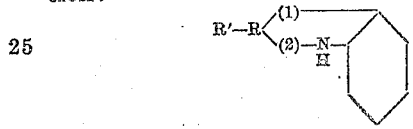

where R is the radical of an oxynaphthalene and R' the isatin radical in ortho position to the oxy group, being blue to violet-black dyestuffs insoluble in the usual solvents and being reduced in treatment with reducing agents to leuco compounds, from which the dyestuffs are regenerated by oxidizing agents.

5. As a new product the vat dye-stuff of the following formula:

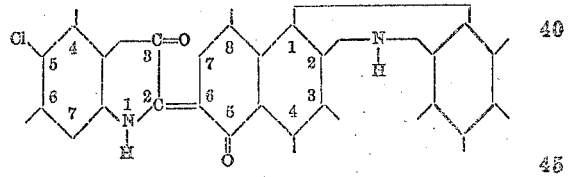

being in dry state a powder insoluble in the usual solvents, soluble in sulfuric acid with a grayish-blue color, being reduced on treatment with reducing agents to a goldish-yellow vat, from which the textile fiber is dyed violet shades.

In testimony whereof I have signed my name to this specification in the presence of two subscribing witnesses.

EDWARD WRAY.

Witnesses:
MORITZ WETZEL,
MARIA HAHN.

Copies of this patent may be obtained for five cents each, by addressing the "Commissioner of Patents, Washington, D. C."